United States Patent Office 3,719,633
Patented Mar. 6, 1973

3,719,633
METHOD FOR PREPARING POLYCARBORANYL-ENESILOXANE POLYMERS
Karl O. Knollmuller, Hamden, and John F. Sieckhaus, Milford, Conn., assignors to Olin Corporation
No Drawing. Filed Oct. 18, 1971, Ser. No. 190,282
Int. Cl. C08f 11/04
U.S. Cl. 260—46.5 E                10 Claims

ABSTRACT OF THE DISCLOSURE

A method for the preparation of high molecular weight linear polycarboranylenesiloxane polymers by the condensation of selected hydroxy terminated, silicon containing carboranes in the presence of a catalyst system consisting of a combination of a selected acid salt of tetramethylguanidine and the acid of said salt.

---

The invention herein described was made in the course of or under a contract or subcontract thereunder, with the Department of the Navy.

This invention relates to the improved method for the preparation of high molecular weight linear polycarboranylene siloxane polymers. More particularly, this invention involves the condensation of selected hydroxy terminated, silicon-containing carboranes in the presence of a catalyst system consisting of a combination of a selected tetramethylguanidine acid salt and the acid of said salt to form polycarboranylenesiloxane polymers.

Several methods for preparing polycarboranylenesiloxane polymers are known in the art. High temperature, ferric chloride catalyzed copolymerization of an alkoxy substituted neocarborane with a halogen containing silane, siloxane or silyl carborane is shown in U.S. Pats. 3,388,-090 to '093. The hydrolytic condensation of silicon containing carboranes is disclosed in copending U.S. application Ser. No. 41,598 entitled "Method for Preparing Poly-Carboranylenesilane Polymers" by H. R. Kwasnik, John F. Sieckhaus and Karl O. Knollmueller, filed on May 28, 1970. Additionally polymers have been prepared by condensation methods using various catalyts as disclosed in U.S. Pat. 3,457,222 (col. 2, lines 25 to 35) including tetramethylguanidine di-2-ethyl hexoate, trifluoroacetic acid and sulfuric acid.

The above-noted methods can satisfactorily produce carboranylenesiloxane polymers, however, the capability of producing high molecular weight linear polymers by such methods is somewhat limited. Additionally, polymers formed by these methods generally are insoluble in common organic solvents and often are in the form of crosslinked gums.

Now it has been found that linear, high molecular weight carboranylenesiloxane polymers can be conveniently and economically prepared by the direct one-step method of this invention. More particularly, this invention relates to the condensation of selected silicon-containing carboranes in the presence of a catalyst system consisting of a combination of a selected tetramethylguanidine acid salt and the acid of said salt. These carboranylenesiloxane polymers formed have recurring units of the formula below:

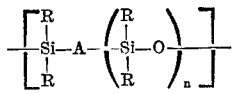

wherein A represents the carborane radical —CB₁₀H₁₀C— or —CB₅H₅C—; each R is an independently selected alkyl group of 1 to 8 carbon atoms, aryl group of 6 to 10 carbon atoms, or trifluoro lower alkyl of 1 to 4 carbon atoms and n represents a number of repeating units whose value will depend on the particular starting material used. It is further noted that —CB₁₀H₁₀C— is utilized to represent both of the well-known m- and p-carborane cage structures as shown for example in U.S. Pat. 3,397,221.

The method of this invention is particularly advantageous over prior known methods because a broader range of starting monomers may be utilized and thus it is possible to prepare carboranylenesiloxane polymers having a wider range of phyical properties. Additionally, the polymers prepared by the method of this invention have outstanding thermal stability, good solubility and low temperature properties and generally have high molecular weights of up to about 200,000 or more. These plus other desirable properties allow the polymers prepared by the method of this invention to have utility in a wide variety of applications including, for example, use as high temperature liquids and coatings, gaskets, o-rings, encapsulation materials, heat resistant adhesives and in liquid partitioning phases used in vapor phase chromatography. Additionally these polymers can be cured at room temperature with tetrafunctional silanes and metal soap catalysts to give elastomers with outstanding thermal properties.

The essence of this invention resides in the particular catalyst being used. More particularly it can be been found that the use of of a catalyst system consisting of a combination of a selected acid salt of tetramethylguanidine and the acid of said salt in the condensation reaction of selected silicon containing carboranes will result in the formation of polymers having high molecular weights. This result was particularly surprising and unexpected in view of the fact that previous condensation reactions using only the individual acids such as sulfuric acid or trifluoroacetic acid or only the acid salt tetramethylguanidine di-2-ethyl hexoate as catalyst resulted in the formation of polymers having especially low molecular weights (see U.S. Pat. 3,457,22).

The tetramethylguanidine acid salt which may be used in the method of this invention is selected from the group consisting of tetramethylguanidine bisulfate, tetramethylguanidine trifluoroacetate and tetramethylguanidine di-2-ethyl hexanoates and the acids combined therewith are sulfuric, trifluoroacetic and 2-ethylhexanoic acid respectively. While any of the aforementioned catalyst systems may be used, most particularly preferred is tetramethylguanidine bisulfate and sulfuric acid. The mole ratio of tetramethylguanidine acid salt to acid which may be used in the catalyst system of this invention may vary from about 0.4:1 to about 5:1 and preferably from about 0.7:1 to about 2:1 with a molor ratio of about 1:1 being most preferred.

The hydroxy terminated, silicon-containing carboranes which are suitable for use as starting materials in the method of this invention are shown by the following formula:

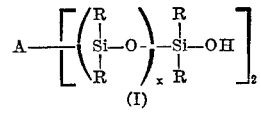

wherein A represents the carborane radical

—CB₁₀H₁₀C— or —CB₅H₅C—; each R is an independently selected alkyl group of 1 to 8 carbon atoms, preferably 1 to 4 or an aryl group of 6 to 10 carbon atoms, preferably phenyl or trifluoro lower alkyl of 1 to 4 carbon atoms, preferably trifluoropropyl and more preferably 3,3,3-trifluoropropyl; and x is from 0 to 2. Thus, for example, each R substituent may be methyl, ethyl, butyl, octyl, phenyl, tolyl, xylyl, naphthyl or 3,3,3-trifluoropropyl.

Basically, these hydroxy terminated, silicon-containing carboranes (I) are prepared by the hydrolysis of the corresponding bis[haloalkyl(or aryl)silyl] carborane as disclosed in U.S. Pat. 3,457,222. Illustrative of the above-described hydroxy terminated, silicon-containing carboranes starting materials are the following compounds:

bis(dimethylhydroxysilyl)carborane
bis(diethylhydroxysilyl)carborane
bis(methylphenylhydroxysilyl)carborane
bis[methyl-(3,3,3-trifluoropropyl)hydroxysilyl]carborane
bis[1,3-dimethyl-1,3-di-(3,3,3-trifluoropropyl)-3-hydroxydisiloxanyl]carborane
bis(1,1,3,3-tetramethyl-3-hydroxydisiloxanyl)carborane
bis(1,1,3-trimethyl-3-phenyl-3-hydroxydisiloxanyl)carborane
bis[1,1,3-trimethyl-3-(3,3,3-trifluoropropyl)-3-hydroxydisiloxanyl]carborane
bis(1,1,3,3,5,5-hexamethyl-5-hydroxytrisiloxanyl)carborane
bis(1,1,3,3-tetramethyl-5,5-diethyl-5-hydroxytrisiloxanyl)carborane
bis(1,1,3,3-tetramethyl-5,5-diphenyl-5-hydroxytrisiloxanyl)carborane In addition to the above-noted carborane monomer materials (I), low molecular weight condensation polymers or oligomers of said materials may be used as starting materials. Additionally, copolymers of organosiloxanes, such as (I), with dihalosilanes or dihalosiloxanes prepared by condensation methods such as disclosed in application Ser. No. 41,598, noted previously, may also be used as starting materials. Generally, the average molecular weight of such polymers or copolymers will vary up to about 10,000 and may even be as high as about 20,000 or higher. The term "prepolymer" is used throughout the specification and claims to represent such low molecular weight oligomers and copolymers.

The condensation reaction of this invention may be carried out over a wide temperature range and more particularly may vary from about 100 to about 250° C. with 150 to 200° C. being preferred.

Generally, a catalytic amount of the catalyst system may be employed in the method of this invention. More particularly, the amount of catalyst used may vary from about 0.5 to about 5 percent by weight based on the starting silicon-containing carborane material with the preferred amount being from about 1 to about 3 percent by weight. The reaction time is generally not critical and will vary widely depending on the particular conditions. Generally reaction times of about 2 to about 16 hours have been used.

While the reaction may proceed in the absence of a solvent, inert organic solvents which are not reactive with anything in the reaction system may be used. Included in such type of solvents would be aromatic hydrocarbons, such as benzene, toluene and xylene, etc. aliphatic hydrocarbons, such as pentane, hexane etc. and ethers such as diethylether.

The method of this invention is further illustrated by the following examples.

EXAMPLE I

Bis(1,1,3,3 - tetramethyl - 3 - hydroxydisiloxanyl)-m-carborane (216 g.) was placed into a one liter flask and heated in an oil bath, set to 200° C., until all product was molten and the interior temperature was about 180° C. The flask was now temporarily removed from the bath and a few boiling chips added. 4.32 g. of a catalyst system made up of tetramethylguanidine bisulfate and sulfuric acid in a 1.08 to 1 molar ratio was added by means of a syringe and the flask shaken. A rapid reaction with steam evolution and boiling of the contents set in lasting about one minute before subsiding. The flask was then reimmersed into the oil bath and connected to a vacuum pump. During reduction of pressure to about 0.5 mm. Hg, rapid steam evolution occurred, subsiding slowly. After 16 hours heating under vacuum to 200° C., the product had turned into a barely flowing viscous mass. The cooled polymer was dissolved in 3 liters diethylether and stirred overnight. The viscous solution was then decanted from small amounts of oily droplets consisting of the catalyst residue. In order to bind excess acidity, the solution was stirred for 2 hours with 10 g. of sodium bicarbonate, 2 g. active carbon and 0.2 ml. of water. The filtered solution was then concentrated to a volume of 800 ml. and precipitated with 2 liters of methanol. The precipitated gum was redissolved in 800 ml. of ether and the precipitation repeated to insure that the last traces of catalyst and lower molecular weight species were removed. Adhering solvent was removed by placing the precipitated polymer into a large beaker and removing the methanol in a vacuum oven at 60° C. and 0.5 mm. Hg.

The resulting product yield was 190.4 g. (92%). The polymer obtained had a peak maximum molecular weight of 52,000 (by gel permeation chromatogram—GPC).

EXAMPLE II

A prepolymer was prepared by adding 115 g. bis-(1,1,3,3 - tetramethyl - 3 - hydroxydisiloxanyl)-m-carborane to 49.8 g. of methylphenyldichlorosilane and heating to 110° C. Twenty (20) grams of the resulting prepolymer which had a peak maximum molecular weight of 2960 (GPC) was dissolved in 250 ml. of xylene and the solution refluxed using a Dean-Stark water trap until after one hour of boiling when essentially no water release was observed. Then 400 mg. of a catalyst system made up of tetramethylguanidine bisulfate and sulfuric acid in a 1.08 to 1 molar ratio was added to the flask and the refluxing continued overnight. The released water was found in the trap and the xylene solution had assumed a dark discoloration. About 80% of the xylene volume was distilled off at atmospheric pressuer and the remainder removed in vacuo at about 80° C.

To the residue was added 200 mls. of diethylether and the solution extracted four times with 100 ml. portions of water. The ether solution was then dried over magnesium sulfate, filtered, concentrated to 80 ml. and precipitated with 350 ml. methanol to remove low molecular weight products. The precipitate was freed from solvents in a vacuum oven of 50° C. at 1 mm. Hg. The product yield was 15 g. (75%) and had a peak maximum molecular weight of 12,500 (GPC).

EXAMPLE III

Bis(1,1,3,3 - tetramethyl - 3 - hydroxydisiloxanyl)-m-carborane (10 g.) was condensed in the presence of 0.3 g. of a catalyst system comprised of tetramethylgluanidine bisulfate and sulfuric acid in a 1.08 to 1 molar ratio. The procedure followed was the same as in Example I with the reaction temperature at 180° C. for 8 hours.

The resulting product yield was 91.4% and the polymer formed had a peak maximum molecular weight of 40,000 (GPC).

EXAMPLE IV

Bis(1,1,3,3 - tetramethyl - 3 - hydroxydisiloxanyl)-m-carborane (10 g.) was condensed in the presence of 0.1 g. of a catalyst system comprised of tetramethylguanidine bisulfate and sulfuric acid in a 2.32 to 1 molar ratio. The procedure followed was the same as in Example I with the reaction temperature at 180° C. for 8 hours.

The resulting product yield was 87.3% and the polymer formed had a peak maximum molecular weight of 12,000 (GPC).

EXAMPLE V

Bis(1,1,3,3 - tetramethyl - 3 - hydroxydisiloxanyl)-m-carborane (10 g.) was condensed in the presence of 0.4 grams of a catalyst system comprised of tetramethylguanidine bisulfate and sulfuric acid in a 1.08:1 molar ratio. The procedure followed was the same as in Example I with the reaction temperature at 200° C. for 12 hours.

The resulting product yield was 92.2% and the polymer formed had a peak maximum molecular weight of 60,000 (GPC).

EXAMPLE VI

Bis(1,1,3,3 - tetramethyl - 3 - hydroxydisiloxanyl)-m-carborane (20 g.) was condensed in the presence of 0.8 gram of a catalyst system comprised of tetramethylguanidine bisulfate and sulfuric acid in a 0.5:1 molar ratio. The procedure followed was the same as in Example I with the reaction temperature at 200° C. for 12 hours.

The resulting product yield was 91.6% and the polymer formed had a peak maximum molecular weight of 29,000 (GPC).

EXAMPLE VII

Bis(1,1,3,3 - tetramethyl - 3 - hydroxydisiloxanyl)-m-carborane (20 g.) was condensed in the presence of 0.4 g. of a catalyst system comprised of tetramethylguanidine trifluoroacetate and trifluoroacetic acid in a 1:1 molar ratio. The procedure followed was the same as in Example I with the reaction temperature at 180° C. for 5 hours.

The resulting product yield was 85.2% and the polymer formed had a peak maximum molecular weight of 21,200 (GPC).

EXAMPLE VIII

Bis(1,1,3,3 - tetramethyl - 3 - hydroxydisiloxanyl)-m-carborane (20 g.) was condensed in the presence of 0.6 gram of a catalyst system comprised of tetramethylguanidine trifluoroacetate and trifluoroacetic acid in a 0.5:1 molar ratio. The procedure followed was the same as in Example I with the reaction temperature at 200° C. for 5 hours.

The resulting product yield was 81.4% and the polymer formed had a peak maximum molecular weight of 16,000 (GPC).

EXAMPLE IX

Bis(1,1,3,3 - tetramethyl - 3 - hydroxydisiloxanyl)-m-carborane (6 g.) was condensed in the presence of 0.06 g. of a catalyst system comprised of tetramethylguanidine di-2-ethylhexanoate and 2-ethylhexanoic acid in a 0.5:1 molar ratio. The procedure followed was the same as in Example II.

The polymer formed had a peak maximum molecular weight of 6700 (GPC).

EXAMPLE X

Bis(1,1,3,3 - tetramethyl - 3 - hydroxydisiloxanyl)-p-carborane (5 g.) was condensend in the presence of 0.15 g. of a catalyst system comprised of tetramethylguanidine bisulfate and sulfuric acid in a 1.08:1 molar ratio. The procedure followed was the same as in Example I with the reaction temperature at 175° C. for 6 hours.

The polymer formed had a peak maximum molecular weight of 15,000 (GPC).

EXAMPLE XI

Bis(dimethylhydroxysilyl) - m - carborane (10 g.) was condensed in the presence of 0.3 g. of a catalyst system comprised of tetramethylguanidine disulfate and sulfuric acid in a 1.08:1 molar ratio. The procedure followed was the same as in Example I with the reaction temperature at 120–160° C. for 4 hours. A quantitative yield of the unpurified product was obtained.

EXAMPLE XII

Bis(dimethylhydroxy) - 2,4 - dicarbacloseheptaborane (3 g.) was condensed in the presence of 0.09 g. of a catalyst system comprised of tetramethylguanidine bisulfate and sulfuric acid in a 1.08:1 molar ratio. The procedure followed was the same as in Example I with the reaction temperature at 170° C. for 5 hours. The product was obtained in a 92% yield.

EXAMPLE XIII

Bis[1,3-dimethyl - 1,3 - di - (3,3,3-trifluoropropyl)-3-hydroxydisiloxanyl]-m-carborane (20 g.) was condensed in the presence of 0.4 g. of a catalyst system comprised of tetramethylguanidine bisulfate and slufuric acid in a 1.08:1 molar ratio. The procedure followed was the same as in Example I with the reaction temperature at 170° C. for 5 hours. The resulting product yield was 51.9% and the polymer formed had a peak maximum molecular weight of 8500 (GPC).

What is claimed is:

1. A method for preparing polycarboranylenesiloxane polymers comprising condensing a compound of the formula:

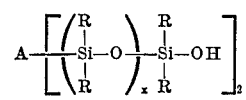

wherein

A represents a carborane radical selected from the group consisting of —CB$_{10}$H$_{10}$C— and —CB$_5$H$_5$C—; each R is independently selected from the group consisting of alkyl of 1 to 8 carbon atoms, aryl of 6 to 10 carbon atoms and trifluoro lower alkyl of from 1 to 4 carbon atoms; and $x$ is 0 to 2 in the presence of a catalytic amount of a catalyst system consisting of a combination of a tetramethylguanidine acid salt selected from the group consisting of tetramethylguanidine bisulfate, tetramethylguanidine trifluoroacetate and tetramethylguanidine di-2-ethylhexanoate and the acid of said acid salt, said catalyst system having a ratio of from about 0.4 to about 5 moles of acid salt per mole of acid, and said condensation being carried out at a temperature of from about 100° C. to about 250° C.

2. The method of claim 1 wherein said catalyst system is tetramethylguanidine bisulfate and sulfuric acid.

3. The method of claim 2 wherein each R is independently selected from the group consisting of alkyl of 1 to 4 carbon atoms, phenyl and 3,3,3-trifluoropropyl.

4. The method of claim 3 wherein the catalyst system is made up of from about 0.7 to about 2 moles of tetramethylguanidine bisulfate per mole of sulfuric acid.

5. The method of claim 4 wherein said compound is selected from the group consisting of bis(1,1,3,3-tetramethyl-3-hydroxydisiloxanyl)-m-carborane, bis(1,1,3,3,5,5-hexamethyl-5-hydroxytrisiloxanyl)-m-carborane, bis(1,1,3,3-tetramethyl-3-hydroxydisiloxanyl)-p-carborane, bis(dimethylhydroxysilyl)-m-carborane, bis[1,3-dimethyl-1,3-di-(3,3,3-trifluoropropyl]-3-hydroxydisiloxanyl)-m-carborane and bis(dimethylhydroxy)-2,4-dicarbacloseheptaborane.

6. The method of claim 1 wherein the catalyst system is made up of from about 0.7 to about 2 moles of said acid salt per mole of said acid and the amount of catalyst used is from about 0.5 to about 5 percent by weight based on the amount of said compound.

7. The method of claim 6 wherein said compound is selected from the group consisting of bis(1,1,3,3-tetramethyl-3-hydroxydisiloxanyl)-m-carborane, bis(1,1,3,3,5,5-hexamethyl-5-hydroxytrisiloxanyl)-m-carborane, bis(1,1,3,3-tetramethyl-3-hydroxydisiloxanyl)-p-carborane, bis(dimethylhydroxysilyl)-m-carborane, bis[1,3-dimethyl-1,3-di-(3,3,3-trifluoropropyl)-3- hydroxydisiloxanyl]-m-carborane and
bis(dimethylhydroxy)-2,4-dicarbaclosoheptaborane.

8. The method of claim 1 wherein a low molecular prepolymer of said compound having an average molecular weight of up to about 20,000 is used.

9. The method of claim 8 wherein said catalyst system is made up of tetramethylguanidine bisulfate and sulfuric acid.

10. The method of claim 9 wherein from about 0.7 to about 2 moles of said bisulfate per mole of said sulfuric acid is used.

References Cited

UNITED STATES PATENTS 3,457,222  7/1969  Papetti _____ 260—46.5

DONALD E. CZAJA, Primary Examiner

M. I. MARQUIS, Assistant Examiner

U.S. Cl. X.R.

117—161 ZA; 260—18 S, 46.5 G, 448.2 E, 606.5 B